Sept. 27, 1932.  S. L. MYATT  1,879,418
ADJUSTABLE FLOOR BOARD AND FOOT REST
Filed July 3, 1930
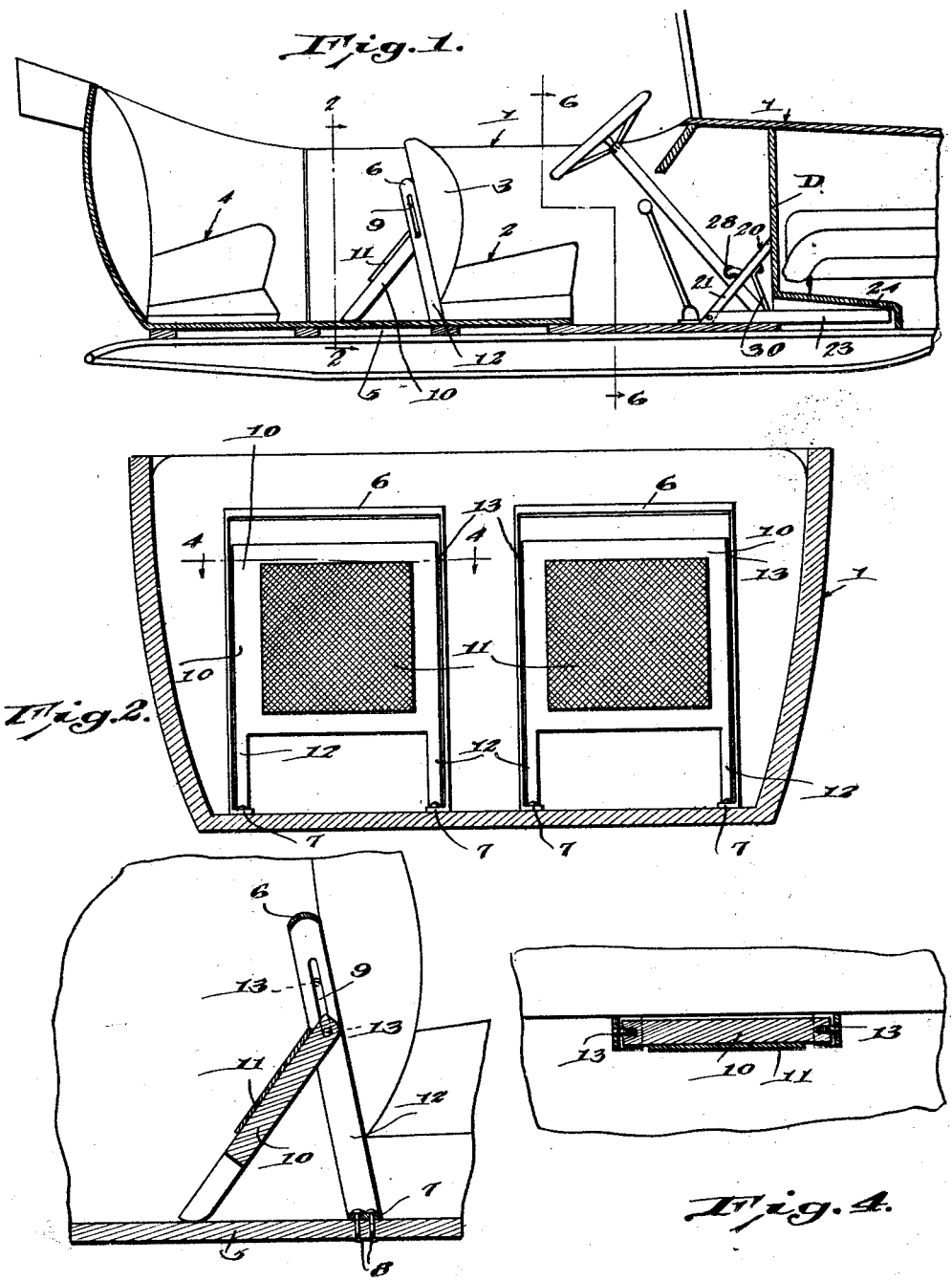
INVENTOR
S. L. Myatt,
BY
ATTORNEY
WITNESS Patented Sept. 27, 1932

1,879,418

UNITED STATES PATENT OFFICE

SAMUEL L. MYATT, OF ST. LOUIS, MISSOURI

ADJUSTABLE FLOOR BOARD AND FOOT REST

Application filed July 3, 1930. Serial No. 465,740.

My invention relates to improvements in footrests for vehicles, and it consists in the combinations, constructions, and arrangements herein described and claimed.

An object of my invention is to provide a footrest which is particularly adapted to automobiles and by means of which the occupants of the rear seats may ride with more comfort, since they may rest their feet in a natural position against a footboard which may be moved into position for instant use.

A further object of the invention is to provide a device of the type described which may be folded back into inoperative position so as to permit free entrance or egress from the car.

A further object is to provide a footrest which is locked in its folded inoperative positions.

Other objects and advantages will appear in the following specification, and the novel features of the invention will be particularly pointed out in the appended claims.

My invention is illustrated in the accompanying drawings, forming part of this application, in which:

Figure 1 is a longitudinal section of an automobile with this improved footrest shown in operative position;

Fig. 2 is a transverse section taken on the line 2—2 of Fig. 1;

Fig. 3 is an enlarged sectional view of the back seat footrest;

Fig. 4 is an enlarged sectional view along the line 4—4 of Fig. 2.

In carrying out my invention, I make use of an automobile of any suitable type, such as a touring car, sedan, etc. In the drawings, 1 indicates the car in general, 2 the front seat, 3 the back of the front seat, and 4 the rear seat.

Secured to the floor 5 of the vehicle by the free ends of its legs is an inverted U-shaped frame 6 which is preferably made of strap metal. The frame has the free end of its leg portions bent inwardly to form flanges 7 through which bolts 8 pass, these bolts being secured to the floor 5 as shown in Fig. 3. The heads of the bolts are spaced apart for a purpose hereinafter disclosed.

The frame 6 which is disposed in upright position and preferably located against the rear face of the back of the front seat has side portions which are provided with longitudinal slots 9. A footboard 10 is provided, having a rubber mat portion 11 and legs 12. The footboard also has pins like that shown at 13 in Fig. 3 which extend through the slots 9 so as to provide a sliding connection with the frame.

As stated above the frame 6 is disposed edgewise in the rear of and adjacent the front seat back 3. Normally, the footrest is in the position shown in Fig. 2, there being two footrests which are alike. The leg portions 12 are curved so that when the footboard is extended, the curved portion rests on the floor. Normally, or when the foot board is in inoperative position, the ends of the legs 12 are disposed between the heads of the bolts 8 whereby the footboard is held parallel with the frame where it is locked from movement by the pin 13 at one end and by the heads of the bolts 8 at the other.

Now when it is desired to use the footrest, the occupant of the car places his foot underneath the footboard 10 between the legs 12, raises the board slightly to clear the heads of the bolts 8, and pulls the footrest outward. The upper part of the rest will move downwardly into the position shown in Fig. 3 with the pins 13 resting in the lower ends of slots 9 and the free ends of legs 12 engaging the floor 5. Thus there is a firm support for the body when the feet are resting on the mat 11. The board is very easily replaced in its original position by an upward and inward movement, the ends of the legs 12 being lowered behind the heads of the bolts 8.

There may be times when one would desire to rest his feet on the top of the frame 6 while the footboard is in its folded inoperative position. This can be readily done, since there is ample space between the top of the footboard 10 and the upper portion of the frame 6 into which the heels of the shoes may enter.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. In combination with the front seat of an automobile, of a disappearing foot rest for passengers upon the rear seat, said foot rest comprising an inverted U-shaped frame composed of strap iron and arranged edgewise against the rear face of said front seat, the ends of said frame being inturned to form attaching feet to engage and be secured to the vehicle floor, laterally spaced bolts securing said ends, the side bars of said frame being longitudinally slotted near the cross bar of the frame, a footboard adapted to fit in said frame and having guide pins engaging said slots to provide for the outward and inward swinging of the board relatively to the frame, said board having longitudinal side extensions with the ends thereof adapted to lie between said bolts when the board is swung to inoperative position and thereby hold the board against swinging movement, said board being vertically movable to release it when desired for use.

2. The combination with the front seat of an automobile, of a disappearing foot rest for passengers upon the rear seat, said foot rest comprising an inverted U-shaped frame disposed against the rear face of said front seat, a pair of spaced apart members for securing each of the lower ends of said frame to the vehicle floor, the side portions of the frame being longitudinally slotted, a footboard adapted to fit in said frame and having guide pins engaging said slots to provide for the outward and inward swinging of the board relatively to the frame, said board having longitudinal side extensions with the ends thereof adapted to lie between said spaced apart securing members when the board is swung to inoperative position, and thereby hold the board against swinging movement, said board being vertically movable to release it when desired for use.

SAMUEL L. MYATT.